United States Patent
Gardner et al.

(10) Patent No.: US 10,044,805 B2
(45) Date of Patent: *Aug. 7, 2018

(54) ASYMMETRIC DATA MIRRORING

(71) Applicant: AT&T INTELLECTUAL PROPERTY II, LP, Atlanta, GA (US)

(72) Inventors: James A. Gardner, Middletown, NJ (US); Darrell G. Freeman, Breckenridge, TX (US)

(73) Assignee: AT&T INTELLECTUAL PROPERTY II, L.P., Atlanta, GA (US)

( * ) Notice: Subject to any disclaimer, the term of this patent is extended or adjusted under 35 U.S.C. 154(b) by 128 days.

This patent is subject to a terminal disclaimer.

(21) Appl. No.: 15/075,287

(22) Filed: Mar. 21, 2016

(65) Prior Publication Data

US 2016/0205191 A1     Jul. 14, 2016

Related U.S. Application Data

(63) Continuation of application No. 14/334,715, filed on Jul. 18, 2014, now Pat. No. 9,344,502, which is a continuation of application No. 13/861,453, filed on Apr. 12, 2013, now Pat. No. 8,819,479, which is a continuation of application No. 13/077,370, filed on Mar. 31, 2011, now Pat. No. 8,443,229, which is a continuation of application No. 12/231,937, filed on Sep. 8, 2008, now Pat. No. 7,941,694, which is a continuation of application No. 11/203,420, filed on (Continued)

(51) Int. Cl.
*G06F 11/00* (2006.01)
*H04L 29/08* (2006.01)
*H04L 12/26* (2006.01)
*H04L 29/06* (2006.01)
*G06F 11/14* (2006.01)
*G06F 11/20* (2006.01)

(52) U.S. Cl.
CPC ...... *H04L 67/1097* (2013.01); *G06F 11/1443* (2013.01); *G06F 11/2064* (2013.01); *G06F 11/2071* (2013.01); *H04L 43/10* (2013.01); *H04L 67/1095* (2013.01); *H04L 67/2842* (2013.01); *H04L 69/28* (2013.01)

(58) Field of Classification Search
CPC .. G06F 11/00; G06F 11/2082; G06F 11/2025; G06F 11/3419; G06F 13/067; G06F 13/065; G06F 13/061; G06F 13/0611; H04L 43/10; H04L 43/0852; H04L 43/0864

See application file for complete search history.

(56) References Cited

U.S. PATENT DOCUMENTS

5,764,903 A   6/1998   Yu
5,933,653 A   8/1999   Ofek
(Continued)

*Primary Examiner* — Nadeem Iqbal
(74) *Attorney, Agent, or Firm* — Scott P. Zimmerman, PLLC (57) ABSTRACT

Methods, systems, and products mirror data between local memory and remote storage. A write command is sent from a server to a remote storage device, and a timer is established. A current time of the timer is compared to a maximum time period. If the maximum time period expires without receipt of an acknowledgment to the write command, then a write error is assumed to exist to the remote storage device.

20 Claims, 5 Drawing Sheets

Related U.S. Application Data

Aug. 12, 2005, now Pat. No. 7,549,080, which is a continuation-in-part of application No. 10/228,776, filed on Aug. 27, 2002, now Pat. No. 6,976,186.

(56) References Cited

U.S. PATENT DOCUMENTS

| | | | |
|---|---|---|---|
| 6,052,797 A * | 4/2000 | Ofek | G06F 11/2064 |
| | | | 709/219 |
| 6,173,377 B1 * | 1/2001 | Yanai | G06F 3/0601 |
| | | | 711/154 |
| 6,223,221 B1 | 4/2001 | Kunz et al. | |
| 6,363,462 B1 | 3/2002 | Bergsten et al. | |
| 6,560,648 B1 * | 5/2003 | Dunn | H04L 41/12 |
| | | | 709/223 |
| 6,591,351 B1 | 7/2003 | Urabe et al. | |
| 6,647,474 B2 | 11/2003 | Castel et al. | |
| 6,976,186 B1 * | 12/2005 | Gardner | G06F 11/1443 |
| | | | 711/162 |
| 7,089,384 B2 | 8/2006 | Tross et al. | |
| 7,130,921 B2 | 10/2006 | Goodman et al. | |
| 7,139,932 B2 | 11/2006 | Watanabe et al. | |
| 7,340,490 B2 * | 3/2008 | Teloh | G06F 11/2058 |
| 7,386,610 B1 | 6/2008 | Vekiarides et al. | |
| 7,549,080 B1 | 6/2009 | Gardner et al. | |
| 8,819,479 B2 * | 8/2014 | Gardner | G06F 11/1443 |
| | | | 714/6.1 |
| 9,292,420 B2 * | 3/2016 | Akbulut | G06F 11/3684 |
| 9,344,502 B2 * | 5/2016 | Gardner | G06F 11/1443 |
| 2001/0047412 A1 | 11/2001 | Weinman, Jr. et al. | |
| 2003/0005355 A1 | 1/2003 | Yanai et al. | |
| 2003/0014432 A1 | 1/2003 | Teloh et al. | |
| 2003/0014433 A1 | 1/2003 | Teloh et al. | |
| 2003/0014523 A1 | 1/2003 | Teloh et al. | |
| 2003/0177186 A1 | 9/2003 | Goodman et al. | |
| 2004/0073831 A1 | 4/2004 | Yanai et al. | |
| 2005/0081089 A1 | 4/2005 | Hayardeny et al. | |
| 2007/0255766 A1 | 11/2007 | Di Giglio et al. | |

* cited by examiner

| λ | A |
|---|---|
| T | 2 |
| T/2 | 3 |
| T/4 | 5 |
| T/8 | 9 |

ASYMMETRIC DATA MIRRORING

CROSS-REFERENCE TO RELATED APPLICATIONS

This application is a Continuation of and claims priority to U.S. patent application Ser. No. 14/334,715 filed Jul. 18, 2014, which is a Continuation of and claims priority to U.S. patent application Ser. No. 13/861,453 filed Apr. 12, 2013, which is a Continuation of and claims priority to U.S. patent application Ser. No. 13/077,370 filed Mar. 31, 2011, which is a Continuation of and claims priority to U.S. patent application Ser. No. 12/231,937 filed Sep. 8, 2008, which is a Continuation of and claims priority to U.S. patent application Ser. No. 11/203,420 filed Aug. 12, 2005, which is a Continuation-in-part of and claims priority to U.S. patent application Ser. No. 10/228,776 filed Aug. 27, 2002. The contents of each of the foregoing are hereby incorporated by reference into this application as if they were set forth herein in full.

FIELD OF THE DISCLOSURE

The present invention relates generally to data mirroring and more particularly to a method of mirroring data in a remote location.

BACKGROUND OF THE DISCLOSURE

Data backup is well known. Traditionally, data backup consisted of copying data onto a bulk archival media such as a tape on a periodic basis. Tape backup has been replaced or supplemented more recently by disk redundancy systems. A disk redundant system typically includes at least two storage devices such as disk storage devices in which identical data is stored. If data in one device is lost or damaged as a result of the device malfunctioning or becoming disabled, the data is retrieved from the other device. In order to protect data, redundant systems are sometimes maintained at different geographic locations. That is, in order to protect data stored at a location from system malfunctions, weather disasters or other types of unforeseen conditions, redundant data is stored at different (or remote) physical locations. Data redundancy is also referred to as data mirroring and typically involves the submission of simultaneous 'write' requests to multiple storage devices.

In mission-critical applications, maintaining synchronization between data at mirrored sites is highly desirable. Synchronization in this context means that all mirrored storage devices must acknowledge receipt of an I/O request from a requesting application before the application may generate the next I/O request. As the distance between the mirrored sites increases, synchronization becomes harder to achieve using existing mirroring techniques and methods as the application generating the I/O request is slowed while awaiting acknowledgement from the remote storage device. Typically, in a data mirroring arrangement, a server is attached or connected to a local data storage device as well as to a remote data storage device with the data from each storage device mirroring that of another. It is possible to obtain synchronization using existing techniques if the physical distance between the mirrored sites is less than approximately twenty-five (25) miles.

For greater distances (i.e., greater than twenty-five miles), existing techniques do not provide synchronicity that is needed for maintaining data security in case of a widespread calamity.

SUMMARY

Methods and systems consistent with the present invention address this limitation by providing a mechanism through which data may be mirrored in remote storage devices in a near synchronized manner.

A method consistent with the present invention includes a server determining a predetermined time period (or time interval) associated with a round trip latency between the server and a remote storage device. The server submits a request to a local storage device and to the remote storage device. The server then submits additional requests to the local and the remote storage devices during the predetermined time period. The server determines whether an acknowledgement associated with the request has been received from the remote storage device during the predetermined time period. The server resubmits the request and the additional requests to the remote storage device if an acknowledgement is not received within the time interval. If an acknowledgement is received within the time interval, the server continues to submit additional requests to the local and remote storage devices.

In accordance with another aspect of the invention, the server submits a request to a local storage device, a remote storage device and a memory device disposed between the server and the remote storage device. The server submits additional requests to the local and remote storage devices during the predetermined time period. The server stores a copy of each request submitted by the server to the remote storage device in a memory disposed between the server and the remote storage device while the server waits for whether an acknowledgement associated with the request has been received from the remote storage device during the predetermined time period. The server resubmits the request and the additional requests to the remote storage device if the acknowledgement is not received. If an acknowledgement is received, the server continues submission of additional new requests to the local and remote storage devices. An acknowledgement is received by the server from the memory disposed between the server and the remote storage device for each request from the server. The contents of the memory disposed between the server and the remote storage device are written to the remote storage device if the acknowledgments from the memory are not received by the server. If the memory disposed between the server and the remote storage device fails to acknowledge the server, the contents of a memory associated with the server are written to the remote storage device. When either memory has been successfully written to the remote storage device, normal I/O operations continue. If neither memory has successfully written to the remote storage device, an error state is triggered.

BRIEF DESCRIPTION OF THE DRAWINGS

The accompanying drawings, which are incorporated in and constitute a part of the specification, illustrate an embodiment of the invention and, together with the description, explain the invention.

DETAILED DESCRIPTION OF THE DRAWINGS

The following description of the implementations consistent with the present invention refers to the accompanying drawings. The same reference numbers in different drawings identify the same or similar elements. The following detailed description does not limit the invention. Instead, the scope of the invention is defined by the appended claims.

Methods and systems consistent with the present invention provide a mechanism through which effective data mirroring is achieved over previous distance limitations.

Existing data mirroring methods include synchronous, asynchronous, semi-synchronous and spoofing. Effectiveness of the current synchronous method is limited to a twenty-five (25) mile physical separation between mirrored sites.

Figure 1A:
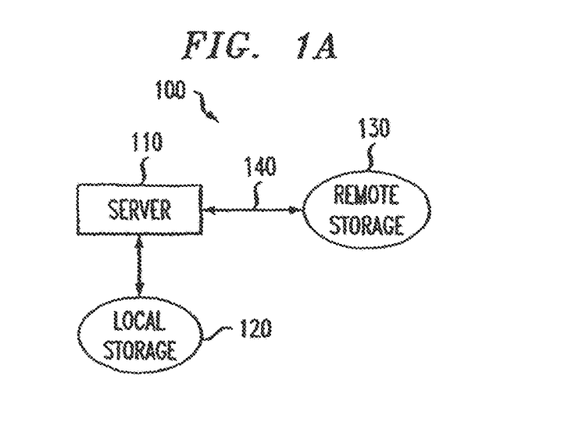
FIG. 1A illustrates a data mirroring system according to exemplary embodiments of the present invention.

A data mirroring system 100 is illustrated in FIG. 1A. The data mirroring system 100 includes a server 110, a local storage device 120 and a remote storage device 130. The server 110 and the remote storage device 130 may be connected via a communication link 140. The communication link 140 may be a cable connection or a wireless connection. The cable may be terrestrial, underwater, etc. It may utilize a fiber optic medium. The network formed by the arrangement of FIG. 1A may be a public or a private network.

There exists an asymmetry in the distance between the server 110 and the storage devices 120 and 130. The distance between server 110 and local storage device 120 is negligible relative to the distance between server 110 and remote storage device 130. In an asymmetric data mirroring (ADM) method according to exemplary embodiments of the present invention, the server 110 first submits an I/O request (such as a 'write' request of a block of data) to both the local and remote storage devices 120 and 130 and then continues to make additional I/O requests to the devices 120 and 130 over a predetermined time period while waiting for an acknowledgement from the remote storage device 130 for the submitted I/O request. According to this exemplary embodiment, an acknowledgement (within the predetermined time period or time interval) is required for each submitted request. The predetermined time period represents the time needed for a signal to traverse the round trip distance between the server 110 and the remote storage device 130 plus the maximum 'write' time of the remote storage device 130. This time period may also be referred to as the round trip latency or network latency and may be measured or determined by a processor, such as processor 112 of FIG. 1B. The 'write' time of the remote storage device 130 may be negligible since the request may first be written to a cache, such as cache 138 of FIG. 1C for example, associated with the remote storage device 130. Therefore, an acknowledgement may be submitted by the remote storage device 130 upon receipt of the 'write' request from the server 110.

It may be appreciated by those skilled in the art that latency between network nodes, such as server 110 and remote storage device 130, may vary as a result of network traffic, etc. Accordingly, multiple readings may be made in order to determine the round trip latency. That is, a number of 'pings' may be submitted by the server 110 to determine the average latency while also noting the minimum and maximum round trip latency values. Furthermore, the latency will change if the distance between the server 110 and the remote storage device 130 is changed for any reason. In this case (i.e., the distance between the server and the remote storage device changes), the latency measurements have to be updated.

Figure 1B:
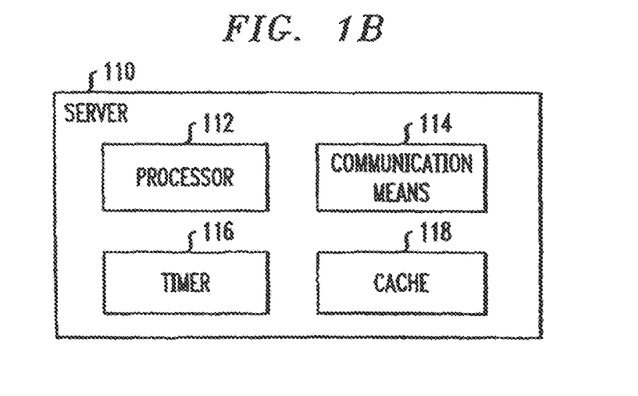
FIG. 1B illustrates a server according to exemplary embodiments of the present invention.
Figure 1C:
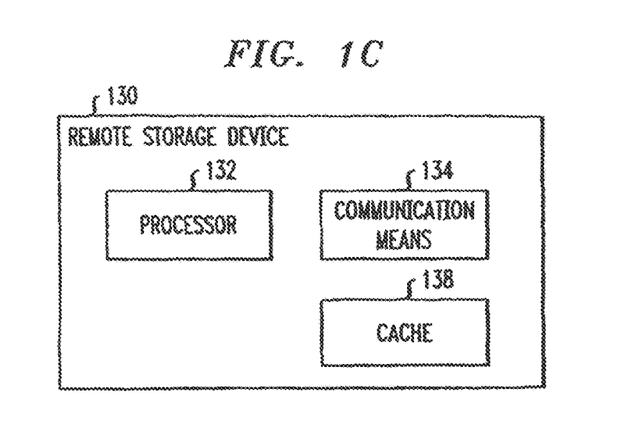
FIG. 1C illustrates a remote storage device according to exemplary embodiments of the present invention.

The request from the server 110 may be generated by the processor 112 of FIG. 1B. The round trip latency may also be measured or determined by the processor 112. A timer, such as timer 116 of FIG. 1B, may be associated with each submitted block of data for measuring the elapsed time from the time the block of data (I/O request) is submitted. A copy of each submitted block of data is stored by the server 110 in memory, such as cache memory 118 of FIG. 1B or another type of memory, until an acknowledgement for that block of data is received. For each request submitted, the server waits for an acknowledgement. Upon receiving an acknowedgement the copy of block data corresponding to the recieved acknowledgement is erased from the memory 118 of the server 110. The requests may be submitted and an acknowledgement received by a communication means 114 of server 110. The remote storage device 130, as illustrated in FIG. 1C, may include a processor 132, a communication means 134 and a cache 138. The communication means 114 and 134 may be implemented using hardware or software such as a process or a script.

If the server 110 does not receive an acknowledgement from the remote storage device 130 within the predetermined time period, all further requests to the devices 120 and 130 are halted. At this point, the request for which an acknowledgement is not received as well as all additional requests that have been submitted are resubmitted, block by block, by the server 110 to the remote storage device 130. The resubmitted blocks of data, as described above, are stored in the server 110 such as in cache 118 or another type of memory associated with the server 110 for example. A timer 116 for each submitted block of data is started. If the server 110 again fails to receive an acknowledgement within the predetermined time period, the server ceases to make additional requests and assumes that there is an error. The error may be a read/write error, a transport error or a network error. The server 110 then seeks detection and correction of an error either in the transport medium 140 or in the remote storage device 130.

Due to the possible variation in the round trip latency, as described above, a certain tolerance level may be added to the predetermined time period. As a result, the server 110 may factor in this tolerance level in waiting for an acknowledgement. The tolerance level may be the difference between the average round trip latency value and the maximum round trip latency value mentioned previously or a percentage of the average round trip latency value. In cases of successive or repeated failures in receiving acknowledgements from the remote device within the time interval, the latency values may be re-measured.

Figure 2:
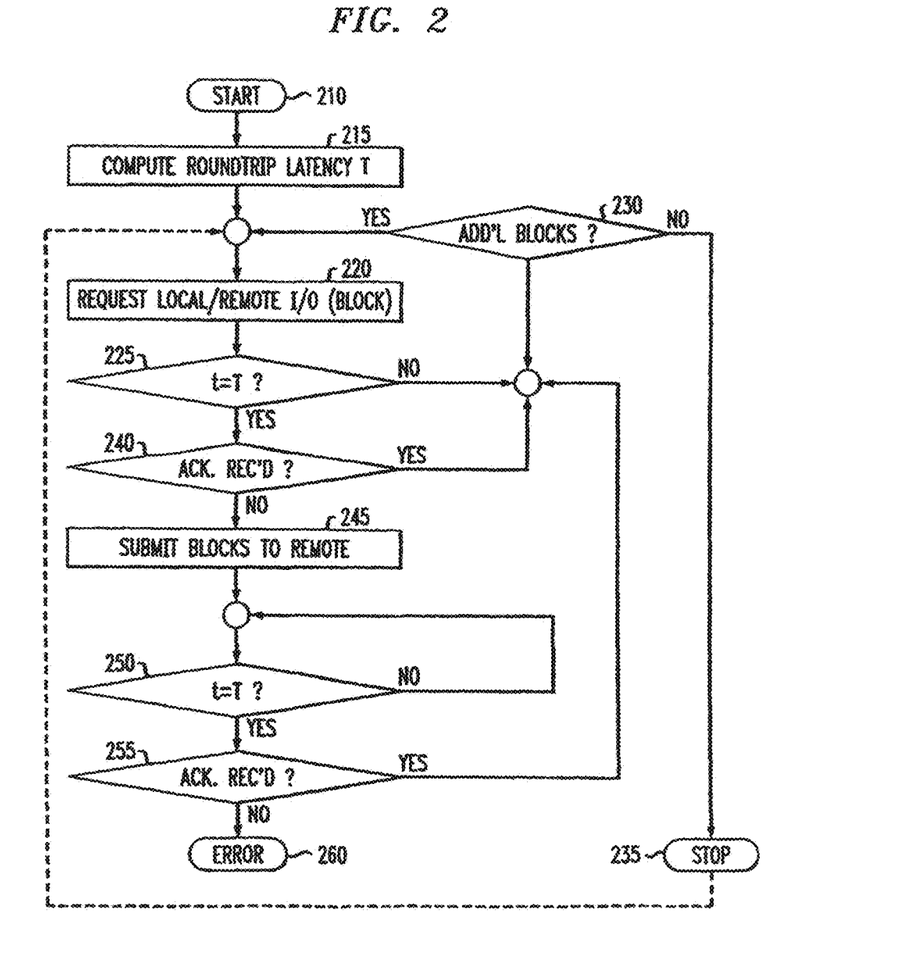
FIG. 2 illustrates a data mirroring method according to exemplary embodiments of the present invention.

FIG. 2 illustrates an exemplary embodiment of the asymmetric data mirroring method of the present invention. A data mirroring process 200 commences in step 210. The server 110 measures a predetermined time period T (round trip latency) in step 215. As described, T represents the time needed for a signal to traverse the round trip distance between the server 110 and the remote storage device 130 plus the maximum 'write' time of the remote storage device 130. At step 220, the server 110 submits an I/O request (such as a 'write' function in the form of a block of data) to the local and the remote storage devices 120 and 130. A timer t measures the time from submission of the request by the server 110. The timer t is compared to the round trip latency T at step 225. While t remains less than T, the server 110 checks for the existence of additional requests that are to be submitted to the storage devices 120 and 130 at step 230. If there are additional requests, the server 110 submits I/O requests to the storage devices 120 and 130 at step 220. If there are no additional requests, as determined in step 230, the writing process comes to a stop in step 235. If the distance between the server 110 and the remote storage device changes, then the process can be restarted at step 210.

When the timer t equals the round trip latency T, the server 110 determines whether an acknowledgement from the remote storage device 130 has been received at step 240. The server checks for the existence of additional requests to be submitted to the storage devices 120 and 130 at step 230 and the determination is followed either by an end to the writing process at step 235 or submission of additional requests to the storage devices 120 and 130 at step 220 as described above.

If an acknowledgement has not been received, the server 110 resubmits to the remote storage device 130, at step 245, all requests (block by block) that have previously been submitted to the storage devices 120 and 130 since the last acknowledgement (if any) while halting submission of new requests. For each request submitted, a timer is started and a copy of the submitted request is maintained by the server 110. The timer t again measures time from the submission of the requests and compares it to the predetermined round trip latency T at step 250. If an acknowledgement from remote storage device 130 is again not received by the server 110 at step 255, an error state is triggered at step 260. On the other hand, if an acknowledgement is received at step 255, the server checks for additional requests to be submitted to the remote storage device at step 230 and the process is continued as described above.

While the above description indicates an error alert being triggered after failure to receive an acknowledgement for a request that has been submitted twice, this number may be increased or decreased. That is, the error state can be triggered after a request has been submitted once and the server has failed to receive an acknowledgement for this request. On the other hand, a particular request may be submitted more than two times and a failure to receive an acknowledgement more than two times can trigger the error alert.

The process may be restarted from 235 upon the generation of a new I/O request. In this case, there is no need to re-compute the round trip latency as long as the distance between the server 110 and the remote storage 130 remains constant. The process may then resume at step 220. Similarly, though not illustrated in FIG. 2, the process may resume at step 220 after the error at step 260 is detected and corrected.

A timer as described above may be a plurality of timers each associated with a submitted request from the server 110. Upon receiving an acknowledgement of the receipt of a particular request, a timer associated with that request may be reset and associated with a next submitted request. As each block of data is submitted by the server, a copy of the block of data is stored in a cache or another type of memory associated with the server until an acknowledgement of the receipt of the submitted block of data is received by the server. If an acknowledgement is received, the timer corresponding to the block of data for which the acknowledgement is received is reset and the copy of this block of data is erased from the server. This facilitates resubmission of previously submitted requests in case of failure by the server in receiving an acknowledgement. The functions of submitting a block of data, 'writing' of the submitted block of data by both the local and remote storage devices and submitting an acknowledgement by the remote storage device are known and therefore are not described further.

Due to the physical separation between server 110 (and local storage device 120) and the remote storage device 130, there is a difference between the data stored in the local device and that stored in the remote device at a particular point in time. That is, a number of blocks of data may be 'written' to the local storage device 120 before they are 'written' in the remote storage device 130 as a result of the difference in distance between the server and each of the storage devices and the time needed to traverse this distance (i.e., round trip or network latency). This number of blocks is the maximum number of blocks of data that may have to be resubmitted by the server to the remote storage device upon failure by the server to receive an acknowledgement according to exemplary embodiments of the present invention.

The number of blocks may depend on a plurality of factors. One factor is the round trip latency or the time needed for a signal to traverse the round trip distance between the server and the remote storage device. This amount of time may also be viewed as the time needed to transport a block of data from the server to the remote storage device plus the time needed for an acknowledgement signal to travel from the remote storage device to the server. Another factor is the frequency at which the I/O requests are generated by the server.

The relationship between the round trip latency (previously designated T) in seconds, the number of blocks (designated delta $\Delta$) and the frequency of I/O requests (designated lambda $\lambda$) in seconds may be represented by: $(T/\lambda]+1)=\Delta$.

Figure 3:
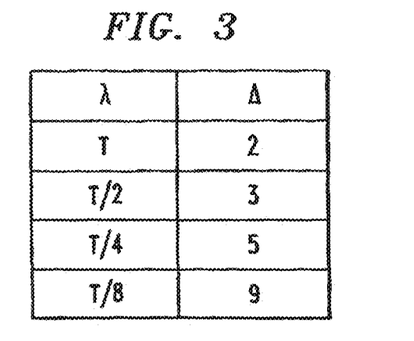
FIG. 3 illustrates a table representing relationship between the frequency of request generation as a function of roundtrip latency and the corresponding block latency between the storage devices according to exemplary embodiments of the present invention.

As the frequency of the generation of I/O requests (as a function of the round trip latency) varies, the number of blocks (of data) by which the local and remote storage devices differ also changes. Some sample values for the difference in the number of blocks is illustrated in FIG. 3.

As the frequency of I/O requests increase, the number of blocks by which the remote storage device 130 differs from the local storage device 120 increases. Knowledge of this number (i.e., difference in blocks) from offered load and network latency facilitates construction and management of a cache in the server or in a network interface device to compensate for the difference between the contents of the two storage devices.

The asymmetric data mirroring method differs from each of the existing synchronous, asynchronous, semi-synchronous and spoofing methods. In the existing synchronous mirroring method, the server submits a write request to both the local and remote storage devices and waits for an acknowledgement from the remote device before a next write request is submitted. That is, until an acknowledgement is received from both the local and the remote storage devices, a subsequent request is not submitted to either of the storage devices. A predetermined time period is implemented within an application performing the data mirroring. The time period is based on a need to maintain a reasonable user or application response time. The remote device must respond (or acknowledge) receipt within this time period or an I/O halt is invoked. Given the need for maintaining a reasonable time period, the distance between the local and remote storage devices is limited to a short distance. Currently, this method is only effective if the distance is limited to 25 miles (or 40 kilometers).

The ADM method according to the present invention utilizes a different method for writing data to the local and remote storage devices. In ADM, as described, an I/O request is transmitted to both the local and remote devices. In contrast to existing synchronous methods, however, subsequent I/O requests to the storage devices 120 and 130 are submitted while waiting for an acknowledgement from the remote device 130. ADM waits for an acknowledgement from the remote device for a time period equal to the round trip latency as described above. ADM utilizes the round trip latency time to submit the additional requests and, at a minimum, keeps the contents of the local storage device updated in the interim time period of waiting for an acknowledgement from the remote storage device.

In an asynchronous mirroring method, I/O requests are submitted by the server to the mirrored pair of data storage devices without requiring a block-by-block acknowledgement. In this method, an amount of data is written and a checksum is performed. If an error is detected, the requests are halted. ADM requires the server to receive acknowledgement of previously submitted I/O requests from the remote storage device block-by-block within a predetermined time period.

In the semi-synchronous data mirroring method, the server is programmed to submit a predetermined number of I/O requests without having to receive acknowledgement of previously submitted I/O requests. When this number of I/O requests is submitted without receiving an acknowledgement, additional I/O requests are halted. ADM requires acknowledgement of the receipt by the storage device of I/O requests (block by block) in order to continue submission of I/O requests by the server to the mirrored storage devices. There is no predetermined number of unacknowledged receipts that are allowed as in the semi-synchronous data mirroring method. Furthermore, in semi-synchronous method, there is no time element. That is, the I/O requests are halted upon a predetermined number of previously submitted requests not having been acknowledged irrespective of the amount of time that has elapsed. As described, in ADM, a pre-determined time period equaling the round trip latency is allocated within which an acknowledgement from the storage devices is to be received by the server before submission of additional I/O requests.

In the spoofing mirroring method, applicable in both asynchronous and semi-synchronous modes, the server prematurely assumes acknowledgement of an I/O request by the storage device; that is, before the storage device actually acknowledges receipt of an I/O request. ADM differs from the spoofing method as well since an actual acknowledgement, block-by-block, is needed in order to continue submission of I/O requests to the storage devices.

Figure 4:
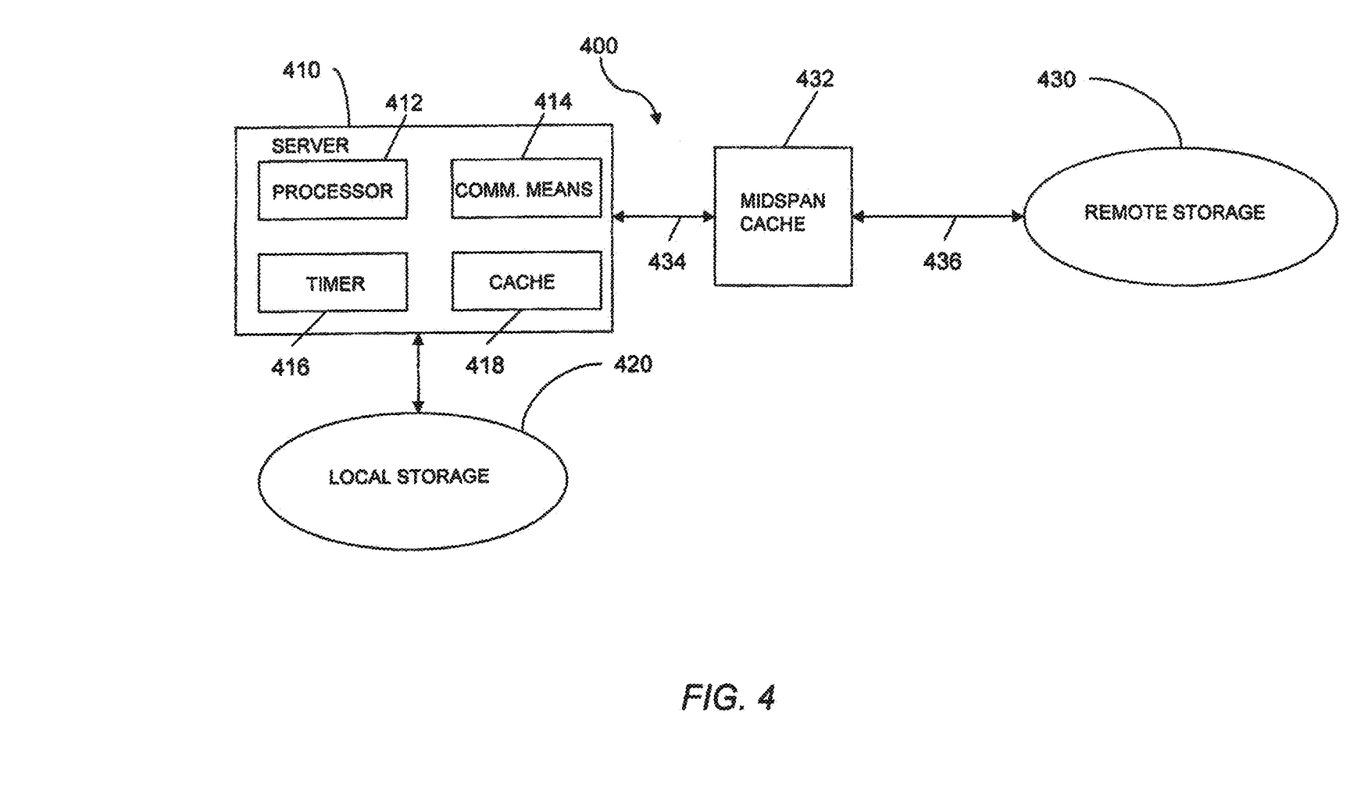
FIG. 4 illustrates an alternative embodiment of a data mirroring system in accordance with an aspect of the invention.

Referring now to FIG. 4, an alternative embodiment of the invention is illustrated, wherein asymmetric data mirroring is implemented with a mid-span cache disposed between the server and the remote storage device. A data mirroring system 400 includes a server 410, a local storage device 420 and a remote storage device 430. A mid-span memory cache 432 is disposed between server 410 and remote storage device 430, and is connected via communication links 434 and 436. The communication links 434, 436 may be a physical or wireless connection of the type well known in the art. The physical connection may comprise a terrestrial or underwater cable or the like, or may employ a fiber optic medium. The network formed by the arrangement of FIG. 4 may be a public or private network.

As in the first embodiment depicted in FIG. 1, there exists an asymmetry in the distance between the server 410 and the storage devices 420 and 430. The distance between server 410 and local storage device 420 is negligible relative to the distance between the server 410 and remote storage device 430. In the ADM method according to an aspect of the invention, the server 410 first submits an I/O request to both the local and remote storage devices 420 and 430 and then continues to make additional I/O request to the devices 420 and 430 over a predetermined time period while waiting for an acknowledgment from the remote storage device 430 for the submitted I/O request. In accordance with this exemplary embodiment, an acknowledgement (within the predetermined time period or interval) is required for each submitted request as explained above with respect to the first embodiment. The request is written to a memory cache 418 associated with the server 410 and the mid-span cache 432. An acknowledgement is submitted to the server 410 by the remote storage device 430 and the mid-span cache 432. The periodicity of I/O requests are set to a minimum level that the user or application can support. As with the first embodiment, if acknowledgments are not received from the remote storage device 430 within the defined round-trip latency period T, I/O requests to the remote storage device 430 are halted. At this point, the server 410 sends a command to the mid-span cache 432 to write the contents of mid-span cache 432 to the remote storage device 430. If I/O acknowledgements are not received by server 410 from the mid-span cache 432, then server 410 writes the contents of cache 418 to remote storage device 430. When either cache 418 or 432 has successfully written its contents to remote storage device 430, normal I/O operations continue. If neither cache 418 nor cache 432 has successfully written its contents to remote storage device 430, an alarm or error condition is signaled. In this embodiment, all data on local storage device 420 is mirrored offsite as the sum of the contents of memory cache 432 and remote storage device 430. In order to provide synchronous mirroring like performance, the mid-span cache may be located at the same distance from the server that synchronous mirroring normally occurs—i.e., approximately 25 miles (40 km).

Figure 5:
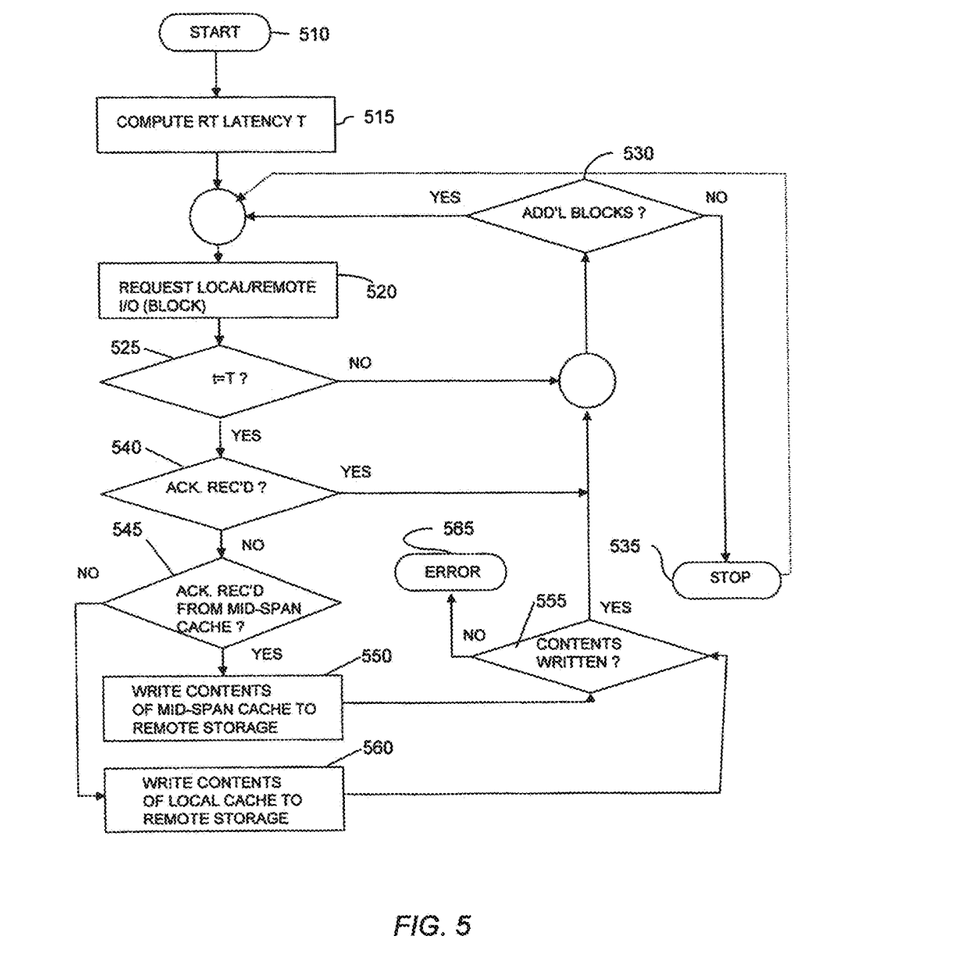
FIG. 5 is a flow diagram of a method in accordance with the alternative embodiment depicted in FIG. 4.

FIG. 5 is a flow diagram of ADM method in accordance with the illustrative embodiment of FIG. 4. A data mirroring process commences in step 510. The server 410 measures a predetermined time period T (round trip latency) in step 415. As described above, T represents the time required for a signal to traverse the round trip distance between server 410 and remote storage device 430, plus the maximum 'write' time of the remote storage device 430. At step 520, sever 410 submits an I/O request (such as a 'write' function in the form of a block of data) to the local and remote storage devices 420 and 430. A timer t measures the time from submission of the request by server 410. The timer t is compared to the round trip latency T at step 525. While t remains less than T, server 410 checks for the existence of additional requests that are to be submitted to the storage devices 420 and 430 at step 530. If there are additional requests, server 410 submits I/O requests to storage devices 420 and 430 at step 520. If there are no additional requests, as determined in step 530, the writing process is halted in step 535. If the distance between server 410 and the remote storage device changes, then the process can be restarted at step 510.

When the timer t equals the round trip latency T, server 410 determines whether an acknowledgement from remote storage device 430 has been received at step 540. The server checks for the existence of additional requests to be submitted to storage devices 420 and 430 at step 530 and the determination is followed either by an end to the writing process at step 535 or submission of additional requests to storage devices 420 and 430 at step 520 as described above.

If an acknowledgement has not been received, server 410 resubmits all requests (block by block) to the remote storage device 430 that were previously submitted since the last acknowledgement (if any) while halting submission of new requests. For each request submitted, a copy of the submitted request has been maintained by server 410 in memory cache 418 and the mid-span cache 432. At step 545 if an acknowledgment for each I/O has been received from the mid-span cache 432, the server 410 instructs the mid-span cache 432 to write its contents to remote storage device 430 at step 550. If the contents of the mid-span cache 432 are successfully written at step 555, control jumps to step 530. If the acknowledgement is not received from the mid-span memory cache 432 at step 545, then the contents of local cache 418 are written to the remote storage device 430 at step 560. If the contents of neither the local cache 418 nor the mid-span cache 432 are written to the remote storage device 430, then an error state is triggered at step 565. During step 555, the timer t again measures the time from the submission of the requests and compares it to the predetermined round trip latency T. If an acknowledgement is not received from the remote storage device 430 after the resubmission, the error state is triggered at step 565.

The process can be restarted from step 535 upon the generation of a new I/O request. In this case, there is no need to re-compute the round trip latency as long as the distance between server 410 and remote storage 430 remains constant. The process may then resume at step 520. Similarly, the process could resume at step 520 after the error state at step 565 is detected and corrected.

The timer t again measures time from the submission of the requests and compares it to the predetermined round trip latency T at step 550. If an acknowledgement from remote storage device 430 is again not received by server 410 at step 555, but acknowledgments from the mid-span memory cache 432 have been received at step 560, then the server 410 instructs the mid-span memory cache 432 to write its contents to remote storage device 430 at step 565. If the contents are successfully written at step 570, control jumps to step 530. If the acknowledgement is not received from the mid-span memory cache 432 at step 560, then the contents of local cache 418 are written to the remote storage device 430.

The foregoing description of exemplary embodiments of the present invention provides illustration and description, but it is not intended to be exhaustive or to limit the invention to the precise form disclosed. Modifications and variations are possible in light of the above teachings or may be acquired from practice of the invention.

The following claims and their equivalents define the scope of the invention.

What is claimed is:

1. A method, comprising:
   determining, by a system including a processor, a time of latency associated with an electronic request to mirror data sent to a remote storage device, the electronic request to mirror the data associated with another electronic request to store the data sent to a local storage device;
   monitoring, by the system, for a receipt of an acknowledgment from the remote storage device;
   determining, by the system, an expiration of the time of latency without the receipt of the acknowledgment from the remote storage device; and
   submitting, by the system, an additional request to the remote storage device in response to the expiration of the time of latency.

2. The method of claim 1, further comprising using a ping command for the determining of the time of latency.

3. The method of claim 1, wherein the determining of the time of latency comprises retrieving the time of latency from a memory accessible to the system.

4. The method of claim 1, further comprising erasing a block of the data responsive to the expiration of the time of latency.

5. The method of claim 1, further comprising caching the data to the local storage device.

6. The method of claim 1, further comprising initializing a timer that counts the time of latency.

7. The method of claim 6, further comprising re-establishing the timer in response to the resubmitting of the additional request.

8. A system, comprising:
   a processor; and
   a memory device for storing instructions that, responsive to being executed by the processor, cause the processor to perform operations, the operations comprising:
   determining a time of latency associated with an electronic request to mirror data sent to a remote storage device, the electronic request to mirror the data associated with another electronic request to store the data sent to a local storage device;
   generating an additional request to the remote storage device while monitoring for a receipt of an acknowledgment sent from the remote storage device;
   determining an expiration of the time of latency without the receipt of the acknowledgment sent from the remote storage device; and
   submitting the additional request to the remote storage device in response to the expiration of the time of latency.

9. The system of claim 8, wherein the operations further comprise determining the time of latency using a ping command.

10. The system of claim 8, wherein the operations further comprise retrieving the time of latency from the memory device.

11. The system of claim 8, wherein the operations further comprise erasing a block of the data responsive to the expiration of the time of latency.

12. The system of claim 8, wherein the operations further comprise caching the data to the local storage device.

13. The system of claim 8, wherein the operations further comprise initializing a timer that counts the time of latency.

14. The system of claim 13, wherein the operations further comprise re-establishing the timer responsive to the resubmitting of the additional request.

15. A memory device storing instructions that when executed cause a processor to perform operations, the operations comprising:
   determining a time of latency associated with a request to store data to a local storage device and to mirror the data to a remote storage device;
   submitting an additional request to the remote storage device while monitoring for a receipt of an acknowledgment sent from the remote storage device;

determining an expiration of the time of latency prior to the receipt of the acknowledgment sent from the remote storage device; and resubmitting the additional request to the remote storage device in a response to the expiration of the time of latency.

16. The memory device of claim 15, wherein the operations further comprise determining the time of latency using a ping command.

17. The memory device of claim 15, wherein the operations further comprise retrieving the time of latency from the memory device.

18. The memory device of claim 15, wherein the operations further comprise erasing a block of the data in response to the expiration of the time of latency.

19. The memory device of claim 15, wherein the operations further comprise caching the data to the local storage device.

20. The memory device of claim 15, wherein the operations further comprise initializing a timer that counts the time of latency.

\* \* \* \* \*